US012592799B2

(12) United States Patent
Berggren et al.

(10) Patent No.: US 12,592,799 B2
(45) Date of Patent: Mar. 31, 2026

(54) ALLOCATION CONFIGURATION FOR TRANSMITTING POSITIONING DATA

(71) Applicant: Sony Group Corporation, Tokyo (JP)

(72) Inventors: Anders Berggren, Lund (SE); Basuki Priyanto, Lund (SE); Johan Hill, Lund (SE); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 452 days.

(21) Appl. No.: 18/018,066

(22) PCT Filed: Jul. 14, 2021

(86) PCT No.: PCT/EP2021/069634
§ 371 (c)(1),
(2) Date: Jan. 26, 2023

(87) PCT Pub. No.: WO2022/028834
PCT Pub. Date: Feb. 10, 2022

(65) Prior Publication Data
US 2023/0275718 A1 Aug. 31, 2023

(30) Foreign Application Priority Data
Aug. 7, 2020 (SE) .................................... 2030248-5

(51) Int. Cl.
*H04W 72/0446* (2023.01)
*H04L 5/00* (2006.01)
(Continued)

(52) U.S. Cl.
CPC .......... *H04L 5/0048* (2013.01); *H04L 5/0094* (2013.01)

(58) Field of Classification Search
USPC ........................................................ 370/330
See application file for complete search history.

(56) References Cited

U.S. PATENT DOCUMENTS

2015/0230112 A1* 8/2015 Siomina ................ H04W 64/00
370/252
2018/0343635 A1* 11/2018 Edge ....................... H04W 4/02
(Continued)

FOREIGN PATENT DOCUMENTS

EP          3751920 A1    12/2020
WO      2018144722 A1     8/2018
(Continued)

OTHER PUBLICATIONS

International Search Report and Written Opinion from corresponding International Application No. PCT/EP2021/069634, mailed on Oct. 20, 2021, 13 pages.
(Continued)

*Primary Examiner* — Maharishi V Khirodhar
(74) *Attorney, Agent, or Firm* — Tucker Ellis LLP

(57) ABSTRACT

According to an aspect, a method is provided of operating a wireless communication device (UE) to provide positioning data for determining a position estimate of the UE, the UE being connected to a communications network via a radio link, the method comprising: receiving, from an access node, AN, of the communications network, an allocation configuration of one or more predetermined resources for transmitting the positioning data; obtaining, from a location server node (LS) a position request message to provide the positioning data; and transmitting the positioning data in response to the position request message on the radio link. According to further aspects, a method of operating an access node, a method of operating a location server node, a wireless communication device, an access node and a location server node are provided.

19 Claims, 4 Drawing Sheets

(51) Int. Cl.

| | | |
|---|---|---|
| *H04W 72/0453* | (2023.01) | |
| *H04W 88/08* | (2009.01) | |

(56) References Cited

U.S. PATENT DOCUMENTS

| | | | | |
|---|---|---|---|---|
| 2019/0037338 A1 | 1/2019 | Edge et al. | | |
| 2019/0166452 A1 | 5/2019 | Tenny | | |
| 2020/0021946 A1 | 1/2020 | Kumar et al. | | |
| 2021/0400620 A1* | 12/2021 | Tao | ...................... | H04W 24/10 |
| 2022/0271888 A1* | 8/2022 | Cha | ...................... | H04W 52/32 |
| 2022/0357418 A1* | 11/2022 | Wang | .................... | H04L 5/0069 |
| 2023/0050521 A1* | 2/2023 | Manolakos | ........... | H04W 64/00 |
| 2023/0086108 A1* | 3/2023 | Manolakos | ........... | G01S 5/0036 |
| | | | | 455/456.1 |

FOREIGN PATENT DOCUMENTS

| | | | | | |
|---|---|---|---|---|---|
| WO | 2020091545 A1 | 5/2020 | | | |
| WO | 2020093358 A1 | 5/2020 | | | |
| WO | 2020145739 A1 | 7/2020 | | | |
| WO | WO-2020164405 A1 * | 8/2020 | ........... | H04L 5/0048 |

OTHER PUBLICATIONS

Office Action and Search Report from corresponding Swedish Application No. 2030248-5, mailed on Apr. 22, 2021, 9 pages.
Qualcomm Inc., "Combined Downlink and Uplink NR Positioning Procedures", 3rd Generation Partnership Project (3GPP) TSG-RAN WG2 Meeting #104, R2-1817899, Nov. 12-16, 2018, 18 pages.
ETSI, "TS 122.261 v15.7.0", Mar. 1, 2019 (Mar. 1, 2019), 3GPP TS 22.261 version 15.7.0 Release 15, XP055819884, pp. 1-51.

\* cited by examiner

ALLOCATION CONFIGURATION FOR TRANSMITTING POSITIONING DATA

RELATED APPLICATION DATA

This application is a national phase application of International Application No. PCT/EP2021/069634, filed Jul. 14, 2021, which claims priority to SE Application No. 2030248-5, filed Aug. 7, 2020, both of which are incorporated herein by reference in their entirety.

TECHNICAL FIELD

Examples generally relate to the transmission of positioning data.

BACKGROUND

Mobile devices such as wireless communication devices (sometimes also referred to as user equipment; UE) offer various use cases. One use case is wireless communications. A further use case is positioning of the UE.

To facilitate positioning of UEs, multilateration or triangulation techniques can be employed. An example of multilateration is trilateration. Here, multiple access nodes (AN)— having a well-defined position in a reference coordinate system—transmit positioning signals (also referred to as positioning reference signals, PRSs). A UE can receive the PRSs; then it is possible to perform multilateration or triangulation. One particular positioning technique is observed time-difference of arrival (OTDOA).

OTDOA is, in particular, deployed in Third Generation Partnership (3GPP) cellular networks, such as the Long Term Evolution (LTE) 4G or New Radio (NR) 5G protocols. Here, the UE may receive PRSs from multiple base stations (BSs) or Transmission/Reception Points (TRPs) implementing the ANs and then performs a timing difference of arrival (TDOA) measurement. Results of the TDOA measurements in a form of Reference signal time difference (RSTD) report are transmitted from the UE to a location server (LS) using a positioning protocol (LPP). This is via the 3GPP radio access network (RAN). The LS then performs the positioning estimation based on multilateration and/or triangulation of at least two or at least three results of the TDOA measurements. See 3GPP Technical specification (TS) 38.305, V16.0.0 (2020-03), section 4.3.3.

Many regulatory as well as commercial use cases require obtaining a position estimate of a wireless communication device (UE) connected to a communications network via a radio link. Various location technologies are known to support these known regulatory as well as commercial use cases. For example, a location server node (LS) of the communications network may trigger a wireless communication device to perform a positioning measurement. Performing the positioning measurement may comprise receiving positioning reference signals from one or more access nodes (AN) of the communications network. Once the UE has performed the measurement and collected the positioning measurement report, the UE then has to transmit the positioning measurement report back to the LS. Heretofore, the UE sends an uplink scheduling request (SR) to the access node (AN) connecting the UE to the communications network. The AN connecting the UE to the communications network may also be called a serving AN. The serving AN then sends back an uplink grant in a downlink control channel (PDCCH). Afterwards the UE can transmit the positioning measurement report on an uplink data channel (PUSCH) to the AN. The AN will then forward the measurement report to the LS.

SUMMARY

There may be a need for reducing the latency between providing the trigger, by the LS, to perform a positioning measurement and obtaining, by the LS, the measurement report.

Said need is addressed with the subject-matter of the independent claims. Advantageous examples are described in the dependent claims.

According to a first aspect, a method is provided of operating a wireless communication device (UE) to provide positioning data for determining a position estimate of the UE, the UE being connected to a communications network via a radio link, the method comprising: receiving, from an access node (AN) of the communications network, an allocation configuration of one or more predetermined resources for transmitting the positioning data; obtaining, from a location server node (LS) a position request message to provide the positioning data; and transmitting the positioning data in response to the position request message on the radio link.

According to a second aspect, a method is provided of operating an access node (AN) of a communications network, a wireless communication device (UE) being connected to the communications network via a radio link between the AN and the UE, the method comprising: transmitting, to the UE, an allocation configuration of one or more predetermined resources for transmitting positioning data on the radio link.

According to a third aspect, a method is provided of operating a location server node (LS) of a communications network to obtain positioning data from a wireless communication device (UE) connected to the communications network via a radio link, the positioning data being for determining a position estimate of the UE, the method comprising: providing a position request message to the UE to provide the positioning data, wherein the position request message includes a low latency indication.

According to a fourth aspect, a wireless communication device (UE) is provided, comprising interface circuitry for connecting the UE to a communications network via a radio link, memory circuitry, processing circuitry, wherein the processing circuitry is configured for: receiving, from an access node (AN) of the communications network, an allocation configuration of one or more predetermined resources for transmitting the positioning data; obtaining, from a location server node (LS) a position request message to provide the positioning data; and transmitting the positioning data in response to the position request message on the radio link.

According to a fifth aspect, an access node (AN) is provided comprising interface circuitry for communicating within a communications network and for communicating with a wireless communication device (UE) via a radio link, memory circuitry, processing circuitry, wherein the processing circuitry is configured for: transmitting, to the UE (201), an allocation configuration (244) of one or more predetermined resources (331; 431, 432; 531, 532, 533) for transmitting positioning data (231) on the radio link (105).

According to a sixth aspect, a location server node (LS) is provided comprising interface circuitry for communicating within a communications network, memory circuitry, processing circuitry, wherein the processing circuitry is configured for: providing a position request message to a wireless communication device (UE) to provide the positioning data, wherein the position request message includes a low latency indication.

It is to be understood that the features mentioned above and those yet to be explained below may be used not only in the respective combinations indicated, but also in other combinations or in isolation without departing from the scope of the invention.

DETAILED DESCRIPTION

Figure 1:
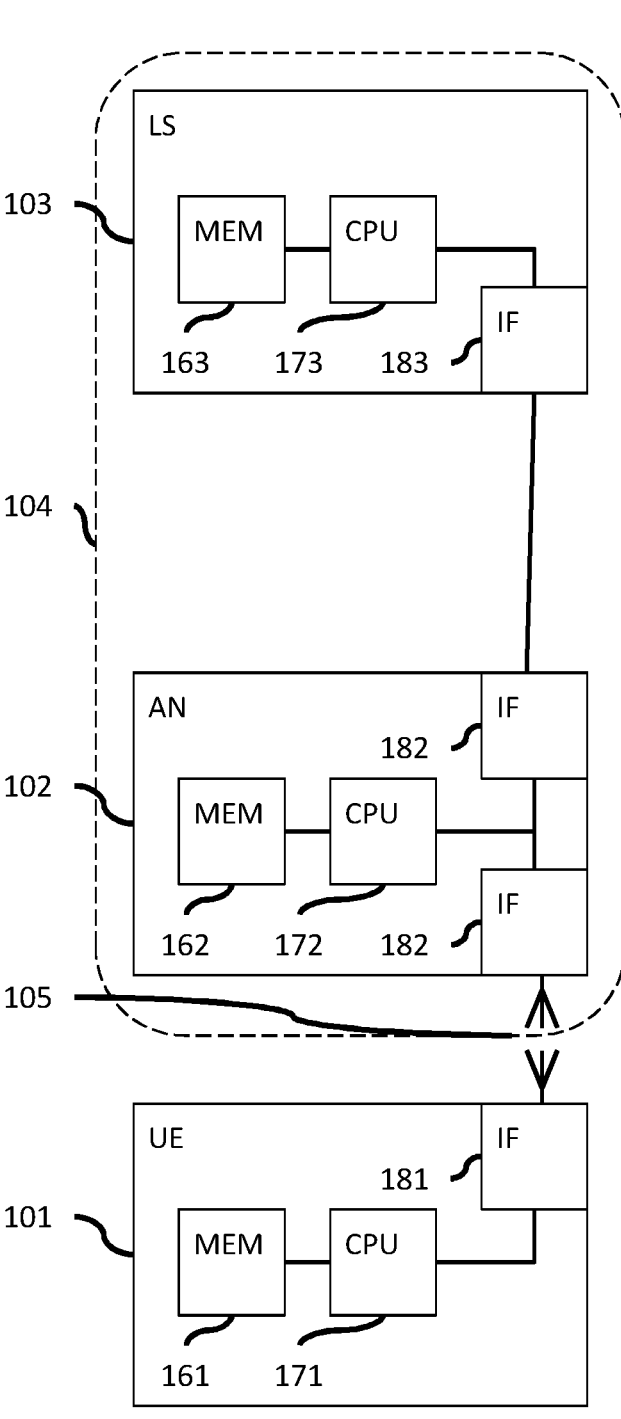
FIG. 1 schematically illustrates a communications network.

Some examples generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically depicts a communications network 104 and a UE 101 being connected to an AN 102 of the communications network 104 via a radio link 105. The UE 101 comprises processing circuitry 171 operably connected to memory circuitry 161 and interface circuitry 181. The processing circuitry 171 may be configured for performing exemplary methods as described herein. The interface circuitry 181 of the UE 101 and the interface circuitry 182 of the AN 102 may allow for communication on the radio channel 105. The AN 102 comprises processing circuitry 172 operably connected to the interface circuitry 182 and to memory circuitry 162 for performing exemplary methods as described herein. The interface circuitry 182 may be directly or indirectly connected with interface circuitry 183 of a LS 103. Processing circuitry 173 of the LS 103 may be operably connected to the interface circuitry 183 and memory circuitry 163 for performing exemplary methods as described herein.

The LS can communicate with, e.g., the ANs and/or the UE using an NRPPa (NR Positioning Protocol A) protocol, and an LTE positioning protocol (LPP), respectively. The LS can determine/estimate the location (or position) of the UE. For the sake of simplicity, various scenarios are described hereinafter with respect to an implementation of the communications network by a cellular network. The cellular network includes multiple cells. Each cell corresponds to a respective sub-area of the overall coverage area. Other example implementations include Institute of Electrical and Electronics Engineers (IEEE) WLAN network, MulteFire, etc.

Figure 2:
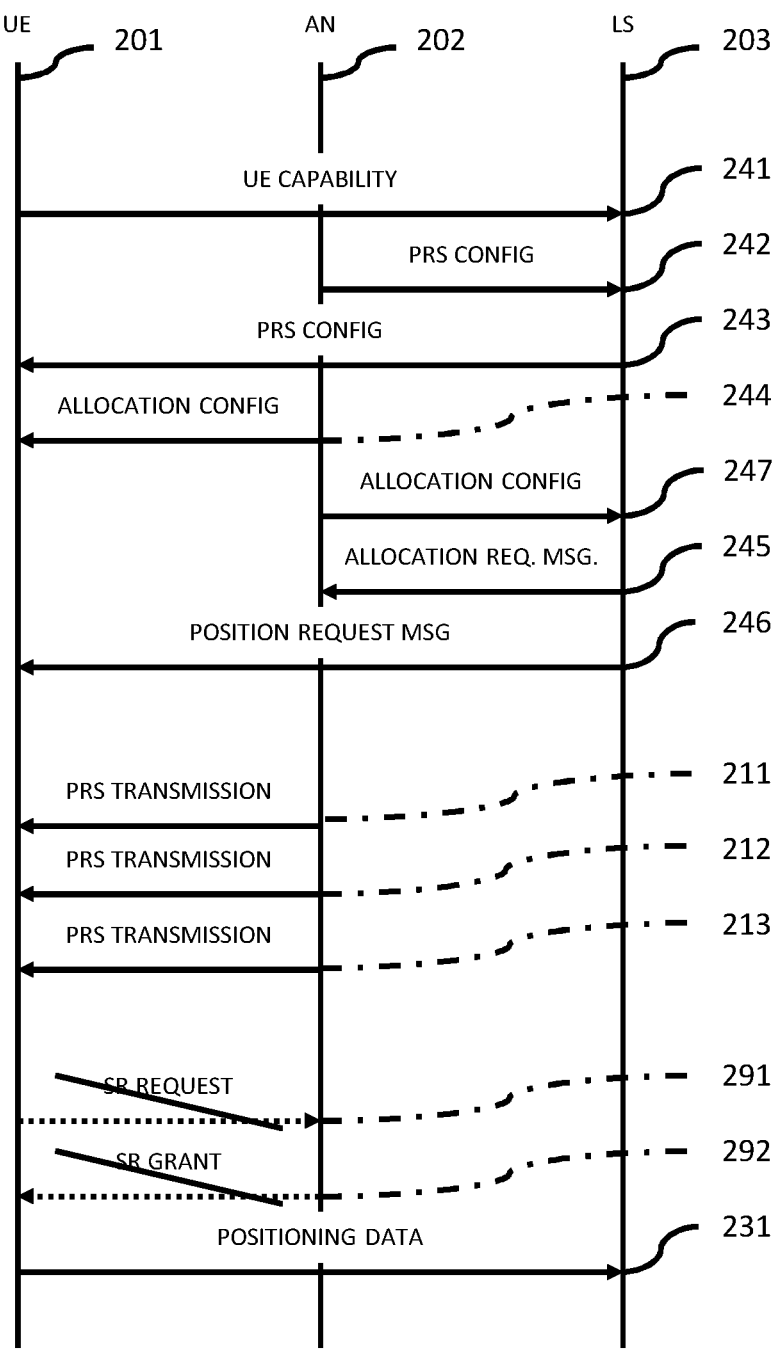
FIG. 2 is a signaling diagram illustrating a method for determining a position estimate.

FIG. 2 is a signaling diagram used for illustrating exemplary methods of operating a UE 201, an AN 202 and/or a LS 203. According to examples, a method of operating a UE 201 comprises receiving, from an AN 202, an allocation configuration 244 of one or more predetermined resources for transmitting positioning data. Further, the UE 201 receives from a LS 203 a position request message 246 to provide positioning data. In response to the position request message 246, the UE 201 transmits the positioning data 231 on the radio link. The position request message 246 may contain a low latency indication. The UE 201 may transmit the positioning data 231 using one or multiple of the one or more predetermined resources.

The AN 202 may be a base station of a RAN. In examples, the AN 202 may be a gNB or Transmission/Reception Point (TRP) according to the 3GPP 5G protocol. The AN 202 may also be an eNB according to the 3GPP 4G protocol. In other examples, the AN 202 may be an access point.

In examples described herein, the wireless communication device (UE) may be a user equipment (e.g., a mobile phone, a smartphone, a tablet, a laptop). The wireless communication device may also refer to other devices and appliances (e.g., sensors, controllers, actuators) used within the Internet-of-Things (IoT).

The positioning data 231 may comprise measurement data derived from positioning reference signals 211, 212, 213. Alternatively, or in addition, the positioning related data may comprise a position estimate derived by different means. For example, the positioning related data 231 may comprise a position estimate obtained by using a Global Navigation Satellite System (GNSS).

In contrast to legacy methods, the present disclosure avoids transmitting a dedicated scheduling request 291 and a corresponding uplink grant 292. The proposed methods are based on the idea that the AN 202 may be aware that the UE has to provide positioning data 231 and may provide an allocation configuration of one or more predetermined resources for transmitting the positioning data beforehand without a dedicated scheduling request 291. In particular, the UE 201 may use one or multiple of the one or more predetermined resources, if the position request message 246 contains the low latency indication.

Predetermined resources may refer to resources which are specified before they are actually allocated by the AN. For example, according to FIG. 2, the predetermined resources are specified before the positioning reference signals are transmitted to the UE. In examples, the predetermined resources may be specified before the UE or AN are made aware that positioning data is to be provided. Predetermined may refer to resources which are specified before the AN receives a request to allocate resources.

The UE 201 may receive the allocation configuration 244 before obtaining the position request message 246. For example, the UE 201 may receive the allocation configuration 244 when connecting to the AN 202. In other examples, for example in the example according to FIG. 6 discussed further below, the UE 201 may receive the allocation configuration after obtaining the position request message 246.

The position request message 246 may include an indication of the one or more multiple predetermined resources. Thus, the LS 203 may prescribe which predetermined resource the UE 201 shall actually use for transmitting the positioning data.

In other examples, the position request message 246 may include an indication not to use the predetermined resources according to the allocation configuration. Thus, although an allocation configuration 244 has been received by the UE 201, the UE 201 may transmit a dedicated scheduling request 291 and receive a corresponding uplink grant 292 for transmitting the positioning data 231. This may be advantageous in situations in which low latency is not of crucial importance and there is a wish to use the predetermined resources for transmitting the positioning data according to the allocation configuration 244 for different purposes.

In examples, the one or multiple predetermined resources may be selected from the one or more predetermined resources specified by the allocation configuration 244 based on one or more predetermined criteria.

The predetermined criteria may comprise at least one of a type of the positioning data, a size of the positioning data, a latency requirement of the positioning data and a positioning accuracy of the positioning data.

For example, different resources may be used if the positioning data includes position measurements compared to a situation in which the positioning data includes a position estimate.

Figure 3:
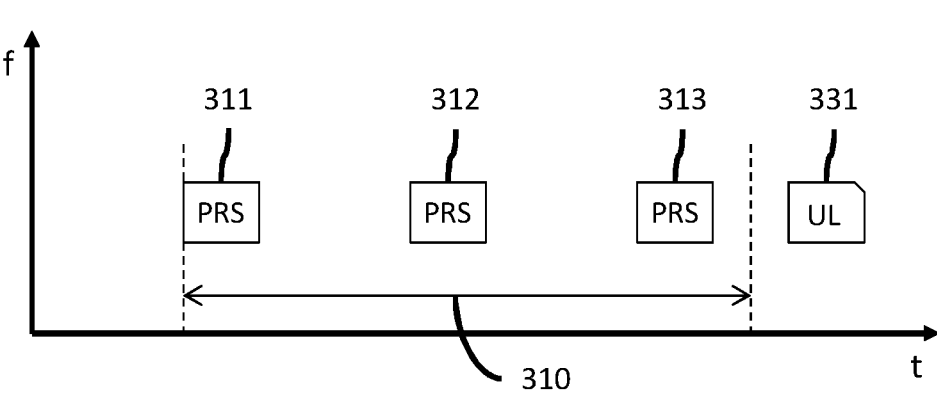
FIG. 3 illustrates resources for transmitting positioning data.
Figure 4:
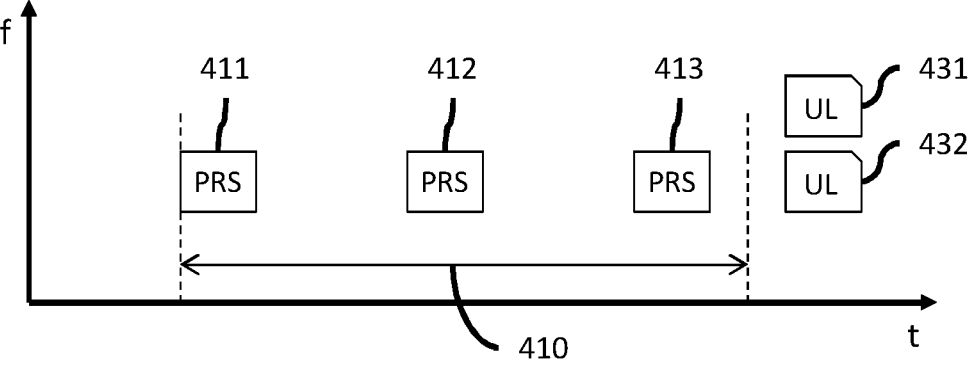
FIG. 4 illustrates resources for transmitting positioning data.
Figure 5:
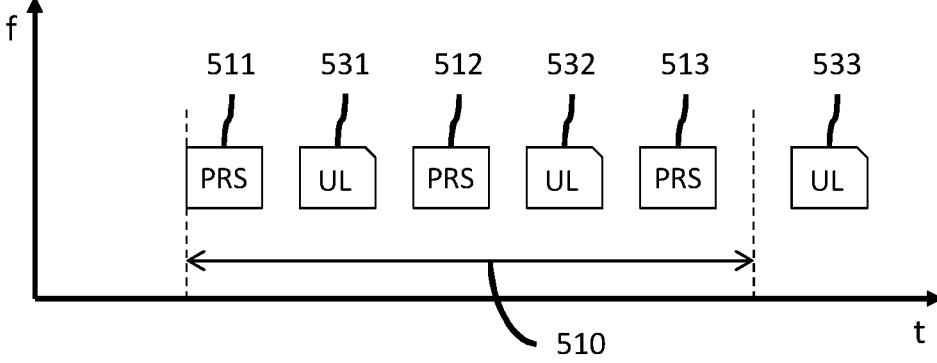
FIG. 5 illustrates resources for transmitting positioning data.

FIGS. 3 to 5 illustrate exemplary resources 331, 431, 432, 531, 532, 533 which may be used for transmitting the positioning data. According to example shown in FIG. 3, the resource 331 for transmitting the positioning data is provided after a positioning occasion (or multiple positioning occasions) 310 in which the UE 201 monitors for positioning reference signals 311, 312, 313. FIGS. 4 and 5 illustrate that more than one predetermined resources 431, 432, 531, 532, 533 may be provided. According to FIG. 4, the more than one predetermined resources 431, 432 may be provided in different frequency domains. Alternatively, the more than one predetermined resources 531, 532, 533 may be provided in different time domains. It is also conceivable that the more than one predetermined resources are provided in different time and frequency domains.

A resource 431 is provided in a frequency domain other than the frequency domain in which a resource 432 exists. Providing the resources 431, 432 in different frequency domains may refer to providing the resources 431, 432 in different frequency bands. Providing the resources 431 and 432 in different frequency domains may also refer to providing the resources 431, 432 inside different physical resource blocks (PRBs), for example different PRBs as specified by the 3GPP 5G protocol. Thus, the predetermined criteria may prescribe using the former resource 431 in case of a larger size of the positioning data 231.

In case the type of the positioning data 231 is measurement data derived from the positioning reference signals 211, 212, 213, the UE 201 may use all predetermined resources 531, 532, 533 to transmit the measurement result relating to the most recent positioning reference signal 211, 212, 213.

If a positioning data 231 with a higher positioning accuracy is to be provided by the UE 201, the UE 201 may use a predetermined resource 531, 532, 533 only when sufficient measurement data has been obtained. For example, the UE may only transmit the positioning data 231 using the last resource 533. In case the UE also has other uplink data to be transmitted (e.g. legacy data transmission), the UE should prioritize or only use resources 331,431,432,531,532, 533 for transmitting the positioning related data 231, 631.

In some examples, the position request message 246 may include an indication of one or more positioning measurements associated with the positioning data 231. For example, the position request message 246 may prescribe that the UE 231 is to perform positioning measurements based on received positioning reference signals 211, 212, 213.

The allocation configuration 244 may include an indication of the one or more predetermined resources in relation to at least one of a further resource used to transmit the position request message 246 on the radio link. In examples, the predetermined resources are expressed with respect to a positioning occasion in which the UE 201 monitors for a positioning reference signal. In particular, the one or more predetermined resources may be given with respect to a first sub-frame of the positioning occasion and/or a last sub-frame of the positioning occasion. The relation may be a time offset and/or a frequency offset with respect to one of the aforementioned references.

In some examples, the UE 201 may provide, to the LS 203, an indication 241 that the UE 201 is capable of receiving, from an AN 202, an allocation configuration 244 of one or more predetermined resources for transmitting the positioning data, and obtaining, from the LS 203 the position request message 246 to provide the positioning data 231. The UE 201 may inform the LS 203 that it is capable of performing one of the proposed methods. Alternatively, or in addition, the UE 201 may provide to the AN 202 an indication that the UE 201 is capable of receiving, from the AN 202, the allocation configuration 244 of one or more predetermined resources for transmitting the positioning data, and obtaining, from the LS 203 the position request message (not shown). The AN 202 may provide the LS 203 with a signal 242 indicative of the configuration of the positioning reference signals 211, 212, 213 later sent to the UE 201. The LS may transmit the configuration of the positioning reference signals 211, 212, 213 to the UE 201 with a signal 243. Signal 242 and 243 may correspond to signals used according to legacy methods.

The proposed method may particularly prescribe not receiving an uplink grant 292 allocating a resource for transmitting positioning data in between obtaining the position request message and transmitting the positioning data, and/or not transmitting an uplink scheduling request 291 for a resource for transmitting the positioning data.

The AN 202 may transmit the allocation configuration 247 to the LS 203. The allocation configuration 247 may be essentially similar to the allocation configuration 244 transmitted by the AN 202 to the UE 201. Thus, the LS 203 may be made aware of the predetermined resources the UE 201 may use for transmitting the positioning related data 231. Accordingly, the LS 203 may select which one or multiple of the one or more predetermined resources the UE 201 is to select to transmit the positioning related data 231.

The allocation configuration 244 transmitted by the AN 202 to the UE 201 may explicitly recite the detailed parameters of the predetermined resources, whereas the allocation configuration 244 transmitted by the AN 202 to the LS 203 may comprise only parameters indicative of the respective predetermined resources, e.g. an index which may have to be interpreted by the LS 203 to find out the actual detailed parameters.

The AN 202 may allocate the one or more predetermined resources 331, 431, 432, 531, 532, 533. Thus, the AN 202 may monitor on the one or more predetermined resources 331, 431, 432, 531, 532, 533 for the reception of positioning related data 231.

In some examples, the AN 202 may allocate one or multiple of the predetermined resources in response to receiving an allocation request message 245 from the LS 203. Thus, the LS 203 may determine which of the predetermined are to be allocated by the AN 202. Moreover, the LS 203 may provide the allocation request message 245 to the AN 202 only together (slightly before or slightly after) with providing a position request message 246 to the UE 201.

In response to receiving the positioning data 231, the AN 202 may de-allocate the one or more allocated predetermined resources again. This may allow the AN to allocate the resource for different purposes. For example, the de-allocated resources may be used for ordinary data transmission and/or by a different UE.

Figure 6:
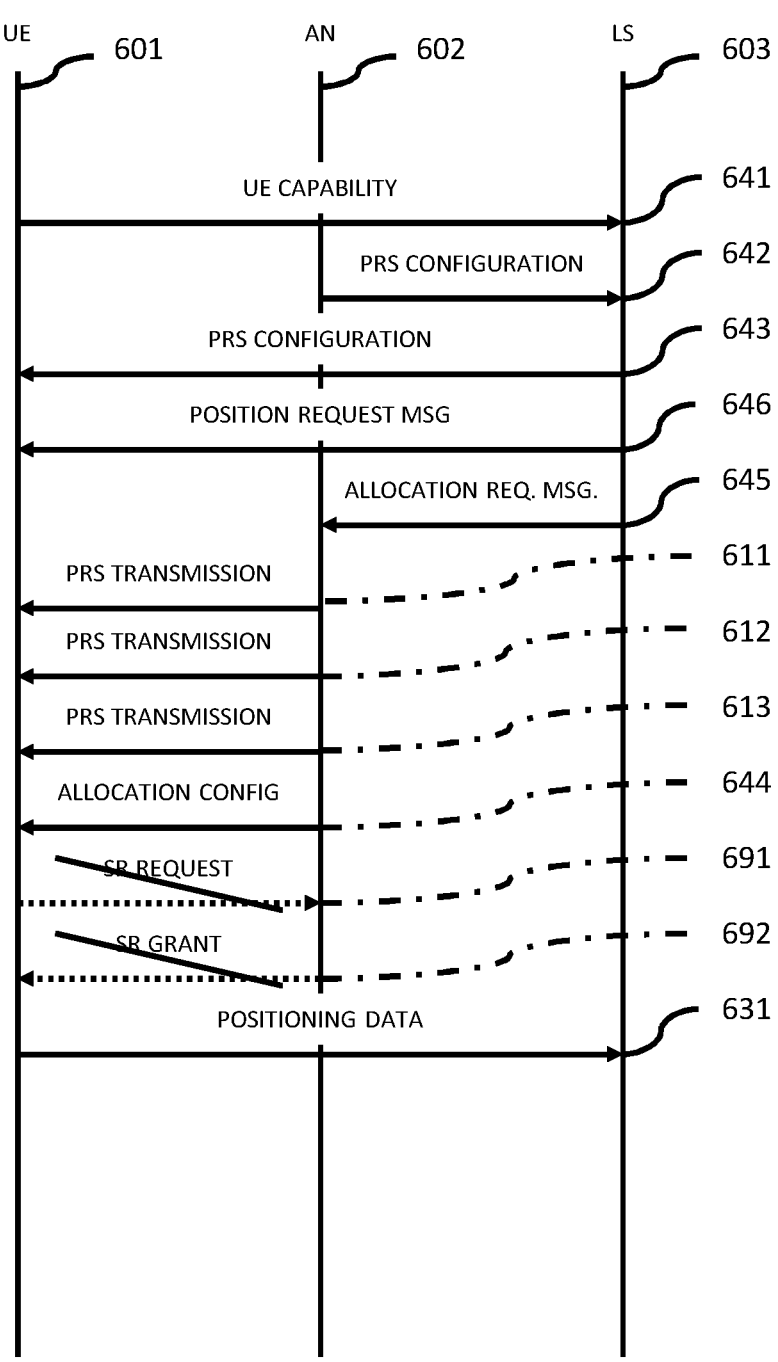
FIG. 6 is a signaling diagram illustrating a method for determining a position estimate.

FIG. 6 shows a signaling diagram illustrating further examples of proposed methods. The UE 601 may indicate its capability to an LS 603 using a signal 641. The LS 603 may obtain a configuration 642 of positioning reference signals 611, 612, 613 and provide the configuration 643 of positioning reference signals 611, 612, 613 to the UE 601. Afterwards, the LS 603 may provide a position request message 646 to the UE 601 and an allocation request message 645 to the AN 602. The UE 601 may measure the positioning reference signals 611, 612, 613. Having transmitted the positioning reference signals 611, 612, 613, the AN 602 may transmit an allocation configuration 644 to the UE 601 and the UE 601 may transmit the positioning data 631 on one or multiple predetermined resources of the one or more predetermined resources according to the allocation configuration. Transmitting the allocation configuration 644 after the positioning reference signals 611, 612, 613 may allow for a greater flexibility for managing resource by the AN 602. Transmitting the allocation configuration 244 before transmitting the positioning reference signals 611, 612, 613 may allow for using the same allocation configuration 244 for multiple positioning occasions. Moreover, in the example of FIG. 2 less time may pass between measuring the positioning reference signals 211, 212, 213 and transmitting the result as positioning data 231 as the required resources have been defined beforehand.

In the examples shown in FIGS. 2 and 6, the positioning reference signals 211, 212, 213, 611, 612, 613 are transmitted by the same AN 202, 602, which transmits the allocation configuration 244, 644, for simplification purposes. Typically, the UE 201, 601 will receive positioning reference signals from a plurality of ANs. Receiving positioning reference signals from a plurality of ANs, which are provided at different physical locations may improve the accuracy of positioning measurements. In extreme cases, the UE 201, 601 will not receive positioning reference signals from the AN 202, 602 which transmits the allocation configuration, but only from one or more different ANs.

The one or more ANs described hereinbefore can have a well-defined position within a reference coordinate system and the UE can be positioned within the reference coordinate system. A receive property of the PRSs (e.g., time-delay, time difference, time-of-flight, angle of arrival (AoA), angle of departure (AoD), and/or signal strength) can be measured and the location of the UE can be estimated based on the receive property. As a general rule, a PRS defines a signal having a well-defined signal shape, e.g., encoding a well-defined bit sequence and/or comprising symbols of appropriate phase and amplitude. A PRS can be used to facilitate positioning. A PRS can be transmitted and/or received (communicated) in well-defined time-frequency resources. Based on a-priori knowledge about the PRS, it is possible to determine the receive property, e.g., amplitude, phase path loss, time-of-travel, and/or angle-of-arrival, etc.

Typically, an AN handles both transmitting the allocation configuration to the UE and receiving the positioning data from the UE. In some cases, an AN transmitting the allocation configuration to the UE may be different from an AN receiving the positioning data. For example, the AN transmitting the allocation configuration to the UE may also provide the allocation configuration to the LS. The AN receiving the positioning data may obtain the allocation configuration from the LS together with the allocation request message.

Aspects of the disclosure may be summarized as follows below. 3GPP Rel-16 specified various location technologies to support regulatory as well as commercial use cases. Rel-17 NR Positioning address higher accuracy location requirements resulting from new applications and industry verticals. Enhancements and solutions to meet the following exemplary performance targets will be investigated and specified. For general commercial use cases (e.g., TS 22.261): a sub-meter level position accuracy (<1 m) is envisaged and for IIoT (Industrial Internet of Things) use Cases (e.g., 22.804) a position accuracy below 0.2 m is foreseen. The target latency requirement is <100 ms; for some IIoT use cases, latency in the order of even 10 ms is desired.

The Access & Mobility Function (AMF) of a NR (New Radio) positioning architecture may receive a request for a location service associated with a UE. Then, the AMF sends a location service request to a Location Management Function (LMF) where it has a connection to an Evolved Serving Mobile Location Centre (E-SMLC) as defined by the 3GPP 5G protocol. The E-SMLC or the location server (LS) has NR/E-UTRAN (Evolved UMTS Terrestrial Radio Access Network as defined by the 3GPP 5G protocol) access information. For example, the LS can trigger positioning measurement at the UE. When using DL-TDoA (Downlink-Time Different of Arrival) or DL-AoD (Downlink-Angle of Departure), the UE performs positioning measurements based on the positioning reference signals (PRS) from the AN, in particular gNB(s). PRSs are typically transmitted periodically and simultaneously from multiple gNBs. The UE performs reference signal time difference (RSTD) measurements and/or reference signal received power (RSRP) measurements. The UE transmits the positioning measurement report back to the E-SMLC via one of the gNBs. The E-SMLC calculates the positioning estimate based on the received positioning measurement. From this simple illustration, it can be observed that the end-to-end latency may involve many signaling paths in both core network and radio access network.

Furthermore, signaling in the legacy radio access network may be described as follows. The LS sends positioning measurement request to the UE via an LPP protocol (and transparent to gNB). The UE performs measurement within a measurement gap, particularly when PRSs from multiple gNBs are scheduled. Once the UE obtains the positioning measurement data, the UE sends an uplink scheduling request (SR) to the serving gNB. The serving gNB sends the corresponding UL grant in the downlink control channel (PDCCH). The UE can then transmit the positioning measurement reports in the uplink data channel (PUSCH) to the LS.

Considering NR Rel-17 is targeting significantly lower end-to-end latency, any attempt to reduce the signaling can be beneficial in order to reduce the latency and meet the latency requirement. Thus, it is proposed to introduce a method to avoid scheduling requests.

The proposed methods enable/allow the UE to transmit positioning measurement reports within a pre-configured time-period after the reception of positioning measurement request. Hence, signaling between positioning measurement request and positioning measurement reporting can be reduced. After the reception of positioning measurement request, the UE can expect to receive configured uplink (UL) grant, in which the uplink allocation will be used for the positioning measurement report. Furthermore, the configured UL grant is allocated by an AN (e.g. gNB) in relation to the transmission of the PRS transmission.

Procedure wise, the proposed methods may be described as follows. In a pre-configuration stage, a UE may indicate via its capability signaling to gNB e,g, via RRC/LS, whether it supports such new operation. The gNB indicates to the UE the parameter (configured grant) of all possible options for the uplink (UL) transmission carrying positioning measurement reports. There can be multiple positioning report options as function of the positioning measurement report size:

i. POS_rep type1 (param: num bits: X1, T/F resources)
   ii. POS_rep type2 (param: num bits: X2, T/F resources)
   iii. POS_rep type 3 (param: num bits: X3, T/F resources)

T/F may relate to Time/Frequency resources allocation and X1-X3 may represent the value of the number of bits. There can also be a generic parameter that applies to the above POS_rep type, such as T/F offset from the PRS allocation. Some of the parameters can be predefined (e.g, in the specifications). For example: report size parameter. Larger measurement reports can contain multiple reports for example RSTD report, RSRP report, results from many gNBs and/or in combination with non-RAT dependent report (GNSS, Bluetooth, etc). In contrast, small measurement reports for example it can contain for example RSTD only, results from a few gNBs. In practice the gNB can activate multiple configurations the above or activate one configuration only.

In the triggering stage, the UE may receive a positioning request message from LS, in which it also indicates the UE can transmit the positioning data at a pre-determined time. The LS may also indicate the UE's serving gNB to activate/allocate resources for positioning measurement report. The pre-determined time for the positioning data can be started for example from:

i. The sub-frame when the UE receives pos meas request; or
   ii. The first sub-frame when the UE receives DL-PRS; or
   iii. The last sub-frame when the UE receives DL-PRS; or The time offset between the DL-PRS subframe above and the pre-determined time for the positioning data is named as T offset.

During the measurement report stage, the UE reports the measurement using configured grant uplink resources according to the pre-configured resources. The gNB may allocate:

i. One configured grant
   ii. Multiple configured grant.

On Multiple configured grants, the UE needs to select one that suits its needs (for example: the positioning measurement results are good enough, depending on the required latency, or required accuracy).

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

Summarizing, at least the following examples have been described above, wherein technical features specified in the examples are followed by reference signs relating to these features, placed in parentheses, to increase the intelligibility of the examples. These reference signs shall not be construed as limiting the disclosure of the examples.

Example 1

A method of operating a wireless communication device, UE, (201) to provide positioning data (231) for determining a position estimate of the UE (201), the UE (201) being connected to a communications network (104) via a radio link (105), the method comprising:

receiving, from an access node, AN, (202) of the communications network (104), an allocation configuration (244) of one or more predetermined resources (331, 431, 432) for transmitting the positioning data (231);
   obtaining, from a location server node, LS, (203) a position request message (246) to provide the positioning data (231); and
   transmitting the positioning data (231) in response to the position request message (246) on the radio link (105).

Example 2

The method of EXAMPLE 1, where the position request message (246) to provide the positioning data from the LS contains a low latency indication.

Example 3

The method of EXAMPLE 1 or 2,
   wherein receiving the allocation configuration (244) is performed before obtaining the position request message (246), or wherein receiving the allocation configuration (644) is performed after obtaining the position request message (646).

Example 4

The method according to any one of EXAMPLES 1 to 3, further comprising
transmitting the positioning data (231) using one (531) or multiple (531, 532, 533) of the one or more predetermined resources (531, 532, 533).

Example 5

The method of EXAMPLE 4,
wherein the position request message (246) includes an indication of the one or multiple predetermined resource (531, 532, 533).

Example 6

The method of EXAMPLE 1 or 3,
wherein the position request message (246) includes an indication not to use the predetermined resources (331; 431, 432; 531, 532, 533) according to the allocation configuration (244).

Example 7

The method of EXAMPLE 3 or 4, the method further comprising
based on one or more predetermined criteria, selecting the one or multiple predetermined resources (531, 532, 533) from the one or more resources (531, 532, 533).

Example 8

The method of EXAMPLE 7, wherein the predetermined criteria comprise at least one of:
a type of the positioning data (231);
a size of the positioning data (231);
a latency requirement of the positioning data (231); and
a positioning accuracy of one or more positioning measurements.

Example 9

The method of any one of EXAMPLES 1 to 8,
wherein the position request message (246) further includes an indication of one or more positioning measurements associated with the positioning data (231).

Example 10

The method of any one of EXAMPLES 1 to 9,
wherein the allocation configuration (244) includes an indication of the one or more predetermined resources (331; 431, 432; 531, 532, 533) in relation to at least one of
a further resource used to transmit the position request message (246) on the radio link (105),
a positioning occasion (310, 410, 510) in which the UE (201) monitors for a positioning reference signal, PRS, (211, 212, 213),
a first sub-frame of the positioning occasion (310, 410, 510), a last sub-frame of the positioning occasion (310, 410, 510).

Example 11

The method of EXAMPLE 10,
wherein the allocation configuration (244) includes a time offset of the one or more predetermined resources (331; 431, 432; 531, 532, 533) in relation to at least one of
a further resource used to transmit the position request message (246) on the radio link (105),
a positioning occasion (310, 410, 510) in which the UE (201) monitors for a positioning reference signal, PRS, (211, 212, 213).
a first sub-frame of the positioning occasion (310, 410, 510),
a last sub-frame of the positioning occasion (310, 410, 510).

Example 12

The method of EXAMPLE 10 or 11,
wherein the allocation configuration (244) includes a frequency offset of the one or more predetermined resources (331; 431, 432; 531, 532, 533) in relation to
a frequency of a positioning reference signal (311, 312, 313; 411, 412, 413; 511, 512, 513) received during the positioning occasion (310, 410, 510).

Example 13

The method of any one of EXAMPLES 1 to 12, further comprising:
providing, to the LS (203), an indication (241) that the UE (201) is capable of receiving, from the AN, the allocation configuration (244) of one or more predetermined resources for transmitting the positioning data, and
obtaining, from the LS (203) the position request message (246) to provide the positioning data (231).

Example 14

The method of any one of EXAMPLES 1 to 13, further comprising:
not receiving an uplink grant (292) allocating a resource for transmitting positioning data in-between obtaining the position request message and transmitting the positioning data, and/or
not transmitting an uplink scheduling request (291) for a resource for transmitting positioning data.

Example 15

A method of operating an access node, AN, (202) of a communications network (104),
a wireless communication device, UE, (201) being connected to the communications network (104) via a radio link (105) between the AN (202) and the UE (201), the method comprising
transmitting, to the UE (201), an allocation configuration (244) of one or more predetermined resources (331; 431, 432; 531, 532, 533) for transmitting positioning data (231) on the radio link.

Example 16

The method of EXAMPLE 15, further comprising transmitting, to a location server node, LS, (203) the allocation configuration (247).

Example 17

The method of EXAMPLE 16,
wherein the allocation configuration (247) comprises an indication of predetermined criteria associated with the one or more predetermined resources (331; 431, 432; 531, 532, 533).

Example 18

The method of EXAMPLE 17,
wherein the predetermined criteria comprise at least one of:
a type of the positioning data (231);
a size of the positioning data (231);
a latency requirement of the positioning data (231); and
a positioning accuracy of one or more positioning measurements.

Example 19

The method of any one of EXAMPLES 15 to 18,
wherein the allocation configuration (247) includes an indication of the one or more predetermined resources (331; 431, 432; 531, 532, 533) in relation to at least one of
a further resource used to transmit the position request message (246) on the radio link (105),
a positioning occasion (310, 410, 510) in which the AN (202) transmits positioning reference signals (211, 212, 213),
a first sub-frame of the positioning occasion (310, 410, 510),
a last sub-frame of the positioning occasion (310, 410, 510).

Example 20

The method of EXAMPLE 19,
wherein the allocation configuration (244) includes a time offset of the one or more predetermined resources (331; 431, 432, 433) in relation to at least one of
a further resource used to transmit the position request message (246) on the radio link,
a positioning occasion (310, 410, 510) in which the AN (202) transmits positioning reference signals (211, 212, 213),
a first sub-frame of the positioning occasion (310, 410, 510),
a last sub-frame of the positioning occasion (310, 410, 510).

Example 21

The method of EXAMPLE 19 or 20,
wherein the allocation configuration (247) includes a frequency offset of the one or more predetermined resources (331; 431, 432; 531, 532, 533) in relation to a frequency of a positioning reference signal (211, 212, 213) transmitted during the positioning occasion (310, 410, 510).

Example 22

The method of any one of EXAMPLES 15 to 21, further comprising
allocating the one or more predetermined resources (331; 431, 432; 531, 532, 533).

Example 23

The method of any one of EXAMPLES 15 to 21, further comprising
obtaining, from a location server node, LS, (203) of the communications network (104), an allocation request message (245) to allocate one or multiple predetermined resources of the one or more predetermined resources (331; 431, 432; 531, 532, 533) on the radio link (105) for transmitting the positioning data (231),
allocating the one or multiple predetermined resources on the radio link (105) in response to obtaining the allocation request message (245).

Example 24

The method of EXAMPLE 23,
wherein the allocation configuration (644) is transmitted in response to the allocation request message (645).

Example 25

The method of any one of EXAMPLES 22 to 24, further comprising
receiving, on one or more of the allocated predetermined resources, the positioning data (231).

Example 26

The method of EXAMPLE 25, further comprising
de-allocating the one or more allocated predetermined resources in response to receiving the positioning data (231).

Example 27

The method of any one of EXAMPLES 23 to 26, further comprising:
not transmitting an uplink grant (292) to the UE (201) indicative of said allocating of the one or multiple predetermined resource.

Example 28

A method of operating a location server node, LS, (203) of a communications network (104) to obtain positioning data (231) from a wireless communication device, UE, (201) connected to the communications network (104) via a radio link (105), the positioning data (231) being for determining a position estimate of the UE (201), the method comprising:
providing a position request message (246) to the UE (201) to provide the positioning data (231), wherein the position request message (246) includes a low latency indication.

Example 29

The method of EXAMPLE 28, further comprising
receiving, from an access node (202) connected to the UE (201) via the radio link (105), an allocation configuration (247) of one or more predetermined resources (331; 431, 432; 531, 532, 533) for transmitting, by the UE (201), positioning data (231) via the radio link (105).

Example 30

The method of EXAMPLE 29,
wherein the position request message (246) includes an indication of one or multiple of the one or more predetermined resources (331; 431, 432; 531, 532, 533) according to the allocation configuration (244),
wherein the one or multiple predetermined resources (331; 431, 432; 531, 532, 533) are to be used for transmitting, by the UE (201), the positioning data (231) on the radio link (105).

Example 31

The method of EXAMPLE 29 or 30,
wherein the position request message (246) includes an indication not to use the predetermined resources according to the allocation configuration (244).

Example 32

The method of EXAMPLE 28 to 31, further comprising
providing, to a or the access node, AN, (202) an allocation request message (245) to allocate one or multiple predetermined resources on the radio link (105).

Example 33

A wireless communication device, UE, (101) comprising
interface circuitry (181) for connecting the UE (101) to a communications network (104) via a radio link (105),
memory circuitry (161),
processing circuitry (171),
wherein the processing circuitry (171) is configured for
receiving, from an access node, AN, (202) of the communications network (104), an allocation configuration (244) of one or more predetermined resources (331, 431, 432) for transmitting the positioning data (231);
obtaining, from a location server node, LS, (203) a position request message (246) to provide the positioning data (231); and
transmitting the positioning data (231) in response to the position request message (246) on the radio link (105).

Example 34

The wireless communication device (101) of EXAMPLE 33,
wherein the processing circuitry (171) is further configured for performing a method according to any one of EXAMPLES 1 to 14.

Example 35

An access node, AN, (102) comprising
interface circuitry (182) for communicating within a communications network and for communicating with a wireless communication device, UE, (101) via a radio link (105),
a memory (162),
processing circuitry (172), wherein the processing circuitry (172) is configured for:
transmitting, to the UE (201), an allocation configuration (244) of one or more predetermined resources (331; 431, 432; 531, 532, 533) for transmitting positioning data (231) on the radio link (105).

Example 36

The access node (102) according to EXAMPLE 35,
wherein the processing circuitry (172) is further configured for performing a method according to any one of EXAMPLES 16 to 27.

Example 37

A location server node, LS, (103) comprising
interface circuitry (183) for communicating within a communications network (104), memory circuitry (163),
processing circuitry (173),
wherein the processing circuitry (173) is configured for:
providing a position request message (246) to a wireless communication device, UE, (201) to provide the positioning data (231), wherein the position request message (246) includes a low latency indication.

Example 38

The location server node (103) of EXAMPLE 37,
wherein the processing circuitry (173) is further configured for performing a method according to any one of EXAMPLES 29 to 32.

Example 39

A computer program or a computer program product or a computer-readable storage medium comprising instructions which, when processed by processing circuitry of a UE, cause the UE to perform a method according to EXAMPLES 1 to 14.

Example 40

A computer program or a computer program product or a computer-readable storage medium comprising instructions which, when processed by processing circuitry of a AN, cause the AN to perform a method according to EXAMPLES 15 to 27.

Example 41

A computer program or a computer program product or a computer-readable storage medium comprising instructions which, when processed by processing circuitry of a LS, cause the LS to perform a method according to EXAMPLES 28 to 32.

The invention claimed is:
1. A method of operating a wireless communication device (UE) to provide positioning data for determining a position estimate of the UE, the UE being connected to a communications network via a radio link, the method comprising:
receiving, from an access node (AN) of the communications network, an allocation configuration of one or more predetermined resources for transmitting the positioning data;
obtaining, from a location server node (LS) a position request message to provide the positioning data;

transmitting the positioning data in response to the position request message on the radio link;

not receiving, from the AN, an uplink grant allocating a resource for transmitting positioning data of the UE in-between obtaining the position request message from the LS node and transmitting the positioning data, and not transmitting, to the AN, an uplink scheduling request for a resource for transmitting positioning data.

2. The method of claim 1, where the position request message to provide the positioning data from the LS contains a low latency indication.

3. The method of claim 1, wherein receiving the allocation configuration is performed before obtaining the position request message, or wherein receiving the allocation configuration is performed after obtaining the position request message.

4. The method of claim 3, the method further comprising based on one or more predetermined criteria, selecting the one or multiple predetermined resources from the one or more resources.

5. The method of claim 4, wherein the predetermined criteria comprise at least one of:

a type of the positioning data;

a size of the positioning data;

a latency requirement of the positioning data; and a positioning accuracy of one or more positioning measurements.

6. The method according to claim 1, further comprising transmitting the positioning data using one or multiple of the one or more predetermined resources.

7. The method of claim 6, wherein the position request message includes an indication of the one or multiple predetermined resource.

8. The method of claim 1, wherein the position request message further includes an indication of one or more positioning measurements associated with the positioning data.

9. The method of claim 1, wherein the allocation configuration includes an indication of the one or more predetermined resources in relation to at least one of a further resource used to transmit the position request message on the radio link, a positioning occasion in which the UE monitors for a positioning reference signal, PRS, a first sub-frame of the positioning occasion, a last sub-frame of the positioning occasion.

10. The method of claim 9, wherein the allocation configuration includes a time offset of the one or more predetermined resources in relation to at least one of a further resource used to transmit the position request message on the radio link, a positioning occasion in which the UE monitors for a positioning reference signal, PRS, a first sub-frame of the positioning occasion, a last sub-frame of the positioning occasion.

11. The method of claim 9, wherein the allocation configuration includes a frequency offset of the one or more predetermined resources in relation to a frequency of a positioning reference signal received during the positioning occasion.

12. The method of claim 1, further comprising:

providing, to the LS, an indication that the UE is capable of receiving, from the AN, the allocation configuration of one or more predetermined resources for transmitting the positioning data, and obtaining, from the LS the position request message to provide the positioning data.

13. A method of operating an access node (AN) of a communications network, a wireless communication device (UE) being connected to the communications network via a radio link between the AN and the UE, the method comprising transmitting, to the UE, an allocation configuration of one or more predetermined resources for transmitting positioning data on the radio link;

not transmitting, to the UE, an uplink grant allocating a resource for transmitting positioning data to the UE in-between the UE obtaining a position request message and the UE transmitting the positioning data, and not receiving, from the UE, an uplink scheduling request for a resource for transmitting positioning data.

14. The method of claim 13, further comprising transmitting, to a location server node (LS) the allocation configuration.

15. The method of claim 14, wherein the allocation configuration comprises an indication of predetermined criteria associated with the one or more predetermined resources.

16. The method of claim 14, further comprising allocating the one or more predetermined resources.

17. The method of claim 16, further comprising receiving, on one or more of the allocated predetermined resources, the positioning data.

18. The method of claim 13, further comprising obtaining, from a location server node (LS) of the communications network, an allocation request message to allocate one or multiple predetermined resources of the one or more predetermined resources on the radio link for transmitting the positioning data, allocating the one or multiple predetermined resources on the radio link in response to obtaining the allocation request message.

19. The method of claim 18, wherein the allocation configuration is transmitted in response to the allocation request message.

\* \* \* \* \*